_United States Patent Office_

3,239,581
Patented Mar. 8, 1966

3,239,581
HARDENABLE MIXTURES OF UNSATURATED POLYESTERS AND MONOMERIC ETHYLENE COMPOUNDS POLYMERIZABLE THEREWITH
Karl Raichle, Krefeld-Uerdingen, and Hans Rudolph, Krefeld, Germany, assignors to Farbenfabriken Bayer Aktiengesellschaft, Leverkusen, Germany, a German corporation
No Drawing. Filed June 5, 1961, Ser. No. 114,606
Claims priority, application Germany, June 8, 1960, F 31,404
4 Claims. (Cl. 260—863)

The present invention is concerned with hardenable mixtures of unsaturated polyesters and monomeric ethylene compounds copolymerizable therewith.

It is known to accelerate polymerization reactions brought about by radical-forming organic peroxides by the addition of small catalytic amounts of a cobalt compound. When using as a radical-forming compound organic ketone peroxides, such as the different cyclohexanone peroxides, methyl ethyl ketone peroxide and methyl isobutyl ketone peroxide, if desired, in admixture with other peroxides, such as benzoyl peroxide, lauroyl peroxide, di-tert.butyl peroxide, tert.butyl hydroperoxide, cumene hydroperoxide, tert.butyl perbenzoate, and perbenzoic acid, the acceleration is especially apparent so that the polymerizations may be carried out at slightly elevated temperatures, frequently even without heating. These peroxide-accelerator combinations are of particular importance of a hardening, based on a cross-linking copolymerization, of mixtures, often designated as "unsaturated polyester resins," of unsaturated polyesters containing the radicals of $\alpha,\beta$-unsaturated ethylene carboxylic acids, and of monomeric ethylene compounds copolymerizable therewith, such as vinyl, acrylic, methacrylic or allyl compounds.

The unsaurated polyesters mentioned above are well known to the art and are described, for example, in U.S. Patent No. 2,931,784 to Raymond. They are generally prepared by the reaction of an $\alpha,\beta$-unsaturated $\alpha,\beta$-polycarboxylic acid or anhydride with a glycol. Typical examples of polybasic acids and anhydrides which may be used to prepare the unsaturated polyesters are maleic, fumaric, itaconic, aconitic, mesaconic, citraconic, ethylmaleic, and dichloromaleic acids and their anhydrides. The foregoing polybasic acids or anhydrides may be esterified with such dihydric alcohols as ethylene glycol, diethylene glycol, 1,2-propylene glycol, 1,2- or 1,3-dipropylene glycol, 1,3-propylene glycol, 1,3-butylene glycol, 1,2-butylene glycol, neopentyl glycol, 1,3-pentanediol, and 1,5-pentanediol. The polyesters may be modified by adding to the esterification reaction other modifying polybasic acids or anhydrides such as, for example, phthalic, terephthalic, isophthalic, succinic, adipic, suberic, azelaic, sebacic and 3,6-endomethylene tetrahydrophthalic acids and anhydrides or their derivatives, such as the halogen-substituted derivatives of the aforementioned acids or anhydrides, examples of which are tetrachlorophthalic and hexachloroendomethylene-tetrahydrophthalic acid. If desired, small amounts of monobasic acids or/and monohydric alcohols, such as propionic acid, butyric acid, saturated and unsaturated higher fatty acids, for instance, palmitic acid, stearic acid, linoleic acid, soybean oil fatty acid, ricinoleic acid and so on, and benzoic acid, as well as amyl alcohol and higher aliphatic alcohols, cyclohexanol, and methylcyclohexanol, may also be used for modifying the polyesters.

A special group of unsaturated polyesters the solutions of which in monomeric ethylene compounds, such as styrene, may be used as air-drying and hardening lacquers are obtained by poly-condensing $\alpha,\beta$-unsaturated dicarboxylic acids as mentioned above with hydroxy compounds containing $\beta,\alpha$-ethylenically unsaturated ether groups as described, for example, in U.S. Patent No. 2,852,482, to Maker and British Patent No. 810,222, to Farbenfabriken Bayer Aktiengesellschaft. Examples of such ether alcohols are allyl, methallyl, ethallyl, chlorallyl, crotyl and cinnamyl ethers of di- or polyhydric alcohols, such as glycols, glycerine, trimethylolethane, -propane, -butane, pentaerythritol, etc., for instance, the glycerol $\alpha$-allylethers, trimethylolethane monomethallyl ether, trimethylolpropane mono- and diallyl ethers, pentaerythritol mono- and triallyl ethers, and glycidallyl ether (allyloxy-2,3,-epoxypropane). The $\beta,\alpha$-unsaturated ether radical may also be introduced into the polyester as an ether acid such as allyloxysuccinic acid and $\beta$-allyloxypropionic acid.

The monomeric ethylene compounds copolymerizable with the unsaturated polyesters which may be used for preparing the "unsaturated polyester resins" mentioned above are likewise well known in the art and are also described, for example, in the aforementioned Raymond Patent No. 2,931,784. Typical representatives of these compounds are, for example, styrene, vinyltoluene, halogenated styrenes and vinyltoluenes, divinylbenzene, vinyl esters, such as vinyl acetate, acrylic and methacrylic acids and their derivatives, aliphatic and aromatic allyl, diallyl and triallyl compounds, such as esters and ethers thereof, for instance, allyl acetate, diallyl phthalate, triallyl phosphatae, diallyl ether, etc.

In actual practice, only those cobalt compounds have proved satisfactory which are readily soluble in unsaturated polyester resins independent of the composition of the polyester resin, since they should be rapidly and homogeneously admixed. Furthermore, the cobalt-containing mixtures must not show any flocculation, even on prolonged storage, and, finally, the cobalt compound must not induce the formation of cloudiness in the hardened product.

However, the cobalt compounds meeting these requirements, such as the preferably used cobalt salts of higher, soap-forming carboxylic acids, for example, the octoate, naphthenate, resinate and linoleate, as well as the cobalt salts of polycarboxylic acid partial-esters, such as mono-isooctylmaleate, and compounds containing chelated cobalt, such as the chelates of cobalt and the enolic forms of acetylacetone ($CH_3$—CO—$CH_2$—CO—$CH_3$) and ethyl acetoacetate ($CH_3$—CO—$CH_2$—COO—$C_2H_5$), which latter is referred to herein as cobalt acetoacetate, have the disadvantage that the hardened products obtained with the use of these accelerators frequently show a green discoloration. The green discoloration is increased by low hardening temperatures. Less reactive polyester resins have a stronger tendency to discoloration, but even reactive resins in which the non-disturbing, much less intensive pink coloration of the starting mixture treated with cobalt accelerators is generally maintained in the hardened product, do not sufficiently ensure the non-appearance of a green discoloration. The green discoloration is especially pronounced when the hardening is carried out at room temperature and a large surface, compared with the volume, is present, i.e., if the heat occurring in the hardening can easily be removed, which is the case, for example, when unsaturated polyester resins are used as lacquers.

The change of color from pale pink to deep green occurring in the hardening of unsaturated polyester resins with ketone peroxides and soluble cobalt accelerators may be explained in that bivalent cobalt is being oxidized to trivalent cobalt by the action of th hydroperoxide.

Such green discolorations are known to be obviated by the addition of compounds of trivalent phosphorus, i.e., phosphorous acid and esters of this acid (P(OH)$_3$). In this case, however, the "gelation time" is delayed, i.e., the time spent after admixing the peroxide to the cobalt-containing polyester resin until gelation of the polyester resin takes place. The delay can be observed especially when an unsaturated polyester resin mixture already treated with a cobalt accelerator and phosphorous acid or its esters, has been stored for a prolonged period of time until it is worked up, i.e., until the hardening is carried out by admixing a peroxide.

It is further known that the gelation period as such, especially in the presence of cobalt accelerators, can be shortened by adding, if necessary, in addition to the cobalt accelerator, other additional catalysts, so-called "promoters," which are preferably amines, as described, for instance, in "The Chemistry and Technology of Selected Modern Synthetic Resins for Surface Coatings" (Verlag, P. G. Keller, Winterthur, 1957) by H. Burkhardt, pages 61–63. The most effective promoters are tertiary aromatic amines; secondary and primary aromatic amines and tertiary, secondary and primary aliphatic amines have a somewhat lesser activity. Polyamines also may be effective as promoters. The presence of several hydroxyl groups in hydroxylamines causes, as has been established, the activating effect of the amine to decrease and frequently even an inhibition of the polymerization to occur. Thus, for example, whilst diethylethanolamine is still a good activator, a delay of the gelation period is observed when using triethanolamine. However, the shortening of the gelation time with the aid of amines in the presence of cobalt accelerators has the disadvantage that throughout hardened products are obtained which are still more intensely discolored than those obtained without an amine addition. Thus, a great number of amines, such as dipropylamine, dibutylamine, N,N-diethylethanolamine (also known as 2-diethylaminoethanol and 2-hydroxytriethylamine), tripropylamine, tributylamine and dodecylamine, increase the green discoloration. Others, such as dimethylaniline, diethylaniline and dimethyl-p-toluidine, lead to strongly yellow to brown colored hardened products, whilst polyamines, such as diethylene-triamines, hexamethylene-diamine and tetraethylene-pentamine may produce intense red and violet discolorations, which are substantially more intense than the slight pink coloration of polyester resins containing the cobalt accelerator only.

Surprisingly, we have now found that with a combined use of acids of phosphorus or of those compounds which are capable of forming such acids in admixture with polyesters, and gelation time-shortening amines, the green discoloration of "unsaturated polyester resins" or "unsaturated polyesters" as defined hereinbefore is avoided and the gelation time not extended. Even if the polyester solution treated with a trivalent phosphorus compound and a cobalt accelerator is stored for a prolonged period of time, the gelation time is not extended or at most only to an insignificant extent, provided hardening is performed in the presence of a gelation time-shortening amine. The time at which the amine is admixed with the polyester is immaterial.

Examples of phosphorus compounds which may be used are phosphoric acid, pyrophosphoric acid, phosphorous acid, phosphonic acids, such as styryl phosphonic acid and n-heptylphosphonic acid, phosphinic acids, such as diphenyl phosphinic acid and diisobutylphosphinic acid, phosphonous acids, such as phenyl phosphonous acid and heptylphosphonous acid, amides or partial esters of these acids, such as phosphoric acid-tris-isobutyl-amide, phosphoric acid-tris-isoamyl-amide, di-n-butyl phosphoric acid, mono-n-butyl-phosphoric acid and mono-n-octylphosphorous acid, phosphorus pentoxide, phosphorus trioxide, phosphorus pentachloride, phosphorus trichloride, phosphorus oxychloride, phosphorus oxybromide and ester halides of acids of phosphorus, such as monobutyl phosphoric acid dichloride and diisobutylphosphoric acid monochloride; furthermore, corresponding thiophosphorus compounds, such as phosphorus triochloride, thiophosphoric acid amides, for example, thiophosphoric acid-tris-isobutylamide and thiophosphoric acid-tris-isoamyl amide, and thiophosphoric acid ester halides, such as diethylthiophosphoryl chloride and monopropylthiophosphoryl dichloride, may be used.

As to the phosphorus compounds which are capable of forming acids of phosphorus in admixture with the polyesters mentioned above it is assumed that these compounds react with hydroxyl or carboxyl groups of the polyesters or with traces of water still present therein, thereby forming such acids.

Examples of amine promoters which may be used are propylamine, butylamine, amylamine, dodecylamine, stearylamine, dipropylamine, dibutylamine, triethylamine, diethyl-ethanolamine, tripropylamine, tributylamines, triamylamine, trihexylamine, tetrahydroquinoline, morpholine, N,N'-tetramethyl-ethylene-diamine, 1-amino-3-methyl-aminopropane, dimethylaniline, diethylaniline, dimethyl-p-toluidine and N-(2-hydroxyethyl)aniline.

The amines are advantageously added to the unsaturated polyester resins or cobalt accelerators. The aforesaid phosphorus compounds may be stirred into the melted polyester at an elevated temperature. Provided that no difficulties occur in dissolving, they may also be added to the polyester resins, i.e., to the solutions of the unsaturated polyesters in a polymerizable monomer or to the cobalt accelerator.

In general, the phosphorus-containing compounds are fully active immediately after their addition. Some compounds, however, such as phosphorus thiochloride and ester halides of thiophosphoric acids, only reach their full activity several days after their addition.

For an optimum dosage of the phosphorus compounds, the cobalt content is decisive which, as a rule, lies between about 0.005 and about 0.1%, referred to the weight of the unsaturated polyester resin. In addition, the reactivity of the polyester is of importance insofar as highly active polyesters require smaller additions of phosphorus compounds than less reactive polyesters. The quantity required can easily be determined in each case by simple preliminary experiments. In general, it is sufficient when about 0.01 to about 3.0 gram atoms of phosphorus are used per gram-atom of cobalt which is equivalent to approximately 0.5 to approximately 150% by weight of phosphorus, computed as phosphorus, of the cobalt metal content of the composition.

The concentration of the amines to be used in combination with the phosphorus compounds substantially depends on the type of amine and concentration of the phosphorus-containing compounds. In this case, too, the optimum concentration may be determined by simple experiments. Generally, additions of about 0.001 to about 1.0% of amine, referred to the unsaturated polyester resin mixture, are sufficient. Excess dosages may be detrimental since the discoloration typical of amines may then again occur.

Any disadvantageous effects of the additions of phosphorus compounds and amines at appropriate concentrations, such as flocculation or cloudiness could not be established either before or after the hardening of the polyester resins, even after storage for several weeks.

In the following examples, which are given for the purpose of illustrating the present invention, all quantities given are to be understood to refer to parts by weight. For determining the gelation time and testing the color of the hardened products, 10 g. samples in test tubes are used which are left in a water bath kept at a temperature of 20° C. which is controlled by means of a thermostat, for removal of the reaction heat until completion of the hardening process.

Table I

| Phosphorus compound and amount (percent by weight) in the polyester solution | Cobalt Accelerator Type | Percent cobalt in the polyester solution | Gram-atoms of phosphorus per gram-atom of cobalt | Amine and amount (percent by weight) in the polyester solution | Peroxide and amount (percent by weight) in the polyester solution | Gelation time (minutes) | Color of the hardened product |
|---|---|---|---|---|---|---|---|
| | Cobalt naphthenate | 0.016 | | | 2.0 cyclohexanoneperoxide | 33 | Green. |
| | ...do | 0.048 | | | ...do | 26 | Dark green. |
| | Cobalt octoate | 0.016 | | | 2.0 methylethylketone peroxide | 28 | Green. |
| | Cobalt acetoacetate | 0.016 | | | 2.0 cyclohexanoneperoxide | 33 | Do. |
| | Cobalt naphthenate | 0.016 | | | 1.5 cyclohexanoneperoxide plus 0.7 cumene hydroperoxide | 80 | Bright green. |
| 0.016 Phosphoric acid [1] ($H_3PO_4 \cdot 1/2 H_2O$) | Cobalt naphthenate | 0.016 | 0.55 | | 2.0 cyclohexanoneperoxide | 56 | Bright pink. |
| Do.[1] | ...do | 0.016 | 0.55 | 0.21 dodecylamine | ...do | 35 | Do. |
| 0.048 Phosphoric acid [1] ($H_3PO_4 \cdot 1/2 H_2O$) | ...do | 0.048 | 0.55 | | ...do | 40 | Pink. |
| Do.[1] | ...do | 0.048 | 0.55 | 0.30 di-n-butylamine | ...do | 26 | Do. |
| 0.011 Pyrophosphoric acid [2] | ...do | 0.016 | 0.46 | | ...do | 61 | Bright pink. |
| Do.[2] | ...do | 0.016 | 0.46 | 0.06 dimethylaniline | ...do | 30 | Bright yellowish. |
| 0.05 Phosphorus pentabromide [3] | ...do | 0.016 | 0.43 | | ...do | 45 | Bright pink. |
| Do.[3] | ...do | 0.016 | 0.43 | 0.28 N,N-diethylethanolamine | ...do | 28 | Almost colorless. |
| 0.022 Phosphorus oxychloride [4] | ...do | 0.016 | 0.53 | | ...do | 40 | Do. |
| Do.[4] | ...do | 0.016 | 0.53 | 0.10 tri-ethylamine | ...do | 30 | Do. |
| 0.047 2-phenyl-2-chloro-ethyl-1-phosphonic acid-di-chloride.[3] | ...do | 0.016 | 0.67 | | ...do | 50 | Bright pink. |
| 0.015 Phosphoric acid mono-n-butyl ester plus 0.019 phosphoric acid-di-n-butyl ester.[4] | Cobalt acetoacetate | 0.016 | 0.67 | | ...do | 30 | Almost colorless. |
| Do.[4] | ...do | 0.016 | 0.69 | 0.20 tri-n-butylamine | ...do | 65 | Bright pink. |
| Do.[4] | Cobalt octoate | 0.016 | 0.69 | | ...do | 32 | Almost colorless. |
| Do.[4] | ...do | 0.016 | 0.69 | 0.15 di-n-propylamine | 2.0 methylethylketoneperoxide | 60 | Bright pink. |
| Do.[4] | Cobalt naphthenate | 0.016 | 0.69 | | ...do | 26 | Bright yellowish. |
| Do.[4] | ...do | 0.016 | 0.69 | 0.11 isobutylamine | 1.5 cyclohexanoneperoxide plus 0.7 cumene hydroperoxide | 130 | Bright pink. |
| Do.[4] | ...do | 0.016 | 0.69 | | 2.0 cyclohexanoneperoxide | 80 | Do. |
| 0.089 Phosphorus thiochloride [5] | Cobalt naphthenate | 0.016 | 1.94 | 0.3 di-n-butylamine | ...do | 40 | Bright yellowish. |
| Do.[5] | ...do | 0.016 | 1.94 | 0.015 N-(2-hydroxyethyl) aniline | ...do | 30 | Do. |

[1] Mixed with the unsaturated polyester at 140° C.  [2] Mixed with the unsaturated polyester at 180° C.  [3] Mixed with the unsaturated polyester at 90° C.  [4] Added to the unsaturated polyester solution at room temperature.  [5] Mixed with the unsaturated polyester solution at 70° C. The hydroperoxide was added after the polyester solution, modified with phosphorus thiochloride, had stood for 4 days at 40° C.

EXAMPLE 1

A polyester obtained by the condensation of 235 parts of maleic anhydride and 828 parts of phthalic anhydride with 738 parts of butane-1,3-diol, with the addition of 0.5 part of hydroquinone, is dissolved in an equal amount of styrene. The gelation times of the polyester solutions thus obtained, as well as the colors of their hardened products, are listed in Table I with the use of different cobalt compounds as catalysts and various hydroperoxides. The table also contains the corresponding data for the polyester solutions additionally modified with different phosphorus compounds, and phosphorus compounds and different amines according to the invention. The addition of the hydroperoxide is always effected last and, if not indicated to the contrary, without any intermediate storage after the addition of the other substances.

EXAMPLE 2

The experiments listed in Tables II and III, which are based on the unsaturated polyester solution described in Example 1, show that, with the combined use of phosphorus compounds and amines according to the invention, the gelatin time is substantially independent of the storage time. In these experiments, the unsaturated polyester solution described in Example 1 is adjusted to a cobalt content of 0.016% by the addition of cobalt naphthenate. In addition, it contains, according to Tables II and III, phosphorus compounds and possibly amines. The hardening is effected, when the polyester solutions treated with the aforesaid additives have been stored for different periods of time, by admixing 2.0% of cyclohexanone peroxide.

amine in admixture with the cobalt naphthenate solution used as indicated above, after the addition of the peroxide, a colorless hardened product is obtained, the gelation time remaining unchanged.

By applying the two catalyst-containing polyester solutions, to which 1.4% of a 10% paraffin solution in toluene are added in known manner for obtaining a surface drying, to bleached maple wood with the aid of a spray gun, both polyester resin lacquers yield, at room temperature after 2 to 3 hours, dry lacquer films which show a greenish discoloration when the unmodified polyester solution is hardened, but are colorless with the lacquer treated with phosphorous pentoxide and propylamine.

Even after grinding and polishing the lacquer coatings, which have a matt finish due to the separated paraffin, the color difference remains so that the bright color of the wood itself remains visible only on that surface which has been coated with the lacquer prepared with the composition of the present invention.

EXAMPLE 4

A 50% styrene solution of an unsaturated polyester obtained by condensing 882 parts of maleic anhydride and 1332 parts of phthalic anhydride with 1098 parts of glycol and 963 parts of trimethylol-propane-diallyl ether, with the addition of 0.43 part of hydroquinone, hardens at 20° C. after the introduction of 0.016% cobalt, added in the form of a 20% solution of cobalt naphthenate in toluene, and after the addition 2.0% cyclohexanone peroxide, has a gelation time of 10 minutes with the formation of a green-colored product.

Table II

Addition:
0.019% di-n-butyl-phosphoric acid [1]
0.015% mono-n-butyl-phosphoric acid [1]

| Storage time at room temperature | Without amine | | Plus 0.27% di-n-butylamine | |
|---|---|---|---|---|
| | Gelation time | Color of hardened product | Gelation time | Color of hardened product |
| 1 day | 75 minutes | Bright pink | 33 minutes | Almost colorless. |
| 6 days | 3.5 hours | do | 42 minutes | Do. |
| 2 months | 4.5 hours | do | do | Do. |

Table III

[Addition: 0.010% phosphoric acid [2]]

| Storage time at 40° C. | Without amine | | Plus 0.3% diethylethanolamine | |
|---|---|---|---|---|
| | Gelation time | Color of hardened product | Gelation time | Color of hardened product |
| 1 day | 1.5 hours | Bright pink | 36 minutes | Almost colorless. |
| 3 days | 2.5 hours | do | 38 minutes | Do. |
| 10 days | 4 hours | do | do | Do. |

[1] See note 4 of Table I.
[2] Added to the unsaturated polyester at 180° C.

EXAMPLE 3

An unsaturated polyester prepared by condensing 297 parts of maleic anhydride and 833 parts of phthalic anhydride with 674 parts of propylene-1,2-glycol, with the addition of 0.45 part of hydroquinone, is dissolved in an equal amount of styrene. After adding 0.016% of cobalt, in the form of a cobalt naphthenate solution in toluene, and 2.0% of cyclohexanone peroxide, the polyester solution gels at 20° C. after 22 minutes with the formation of a green-colored hardened product.

If, however, 0.017% of phosphorous pentoxide is stirred, at 140° C., into the unsaturated polyester before dissolving it in styrene and the unsaturated polyester solution thus obtained is mixed with 0.16% n-propyl-amine in admixture with the cobalt naphthenate solution By adding to the polyester solution 0.038% by weight of N,N'-tetra-methyl-ethylene-diamine, together with 0.062% by weight of a mixture of mono-iso-octyl-phosphoric acid and di-iso-octyl-phosphoric acid, obtained by reacting one mol of phosphorus pentoxide with 4 mols of 2-ethyl-hexan-1-ol, an almost colorless hardened product is obtained whose gelation time is the same as that observed with the foregoing solution catalyzed with cobalt naphthenate and cyclohexanone peroxide.

We claim:
1. A composition consisting essentially of a mixture of
  (i) an unsaturated polyester of an alpha, beta-ethylenically unsaturated dicarboxylic acid and a polyhydric alcohol,

(ii) a monomeric ethylenically unsaturated compound that is copolymerizable therewith, (iii) an accelerator consisting of an organic compound of cobalt in an amount between about 0.005 and about 0.1 percent by weight, computed as cobalt metal, of the said composition, (iv) a phosphorus compound of the group consisting of acids of phosphorus and phosphorus compounds that form such acids in admixture with the said polyester, in an amount between about 0.5 and about 150 percent by weight, computed as phosphorus, of the cobalt metal content of the said composition, and (v) an amine promoter in an amount between about 0.001 and about 1.0 percent by weight of the said composition, which composition is hardenable at room temperatures, without discoloration and without substantially affecting the gelation time of the composition, by the addition thereto of an organic radical-forming peroxide.

2. A composition as defined in claim 1 in which the accelerator is selected from the group consisting of cobalt naphthenate, cobalt octoate and cobalt aceto acetic ester.

3. A composition as defined in claim 1 in which the phosphorus compound is selected from the group consisting of phosphoric acid, pyrophosphoric acid, phosphorus pentoxide, phosphorus pentabromide, phosphorus oxychloride, phosphoric acid mono-n-butyl ester, phosphoric acid-di-n-butyl ester, phosphoric acid-mono-isooctyl ester, phosphoric acid-di-isooctyl ester, 2-phenyl-2-chloroethyl-1-phosphonic acid dichloride, and phosphorus thiochloride.

4. A composition as defined in claim 1 in which the amine promoter is selected from the group consisting of n-propylamine, isobutylamine, dodecyl amine, di-n-propylamine, di-n-butylamine, di-ethyl aniline, triethylamine, tri-n-butylamine, diethylethanol amine, N-(2-hydroxyethyl) aniline, and N,N'-tetra-methylethylene diamine.

References Cited by the Examiner
UNITED STATES PATENTS

| | | | |
|---|---|---|---|
| 2,543,636 | 2/1951 | Loritsch | 260—865 |
| 2,931,784 | 4/1960 | Raymond | 260—861 |
| 3,001,967 | 9/1961 | Willersinn | 260—863 |
| 3,003,991 | 10/1961 | Marszewski | 260—863 |

MURRAY TILLMAN, *Primary Examiner.*

L. J. BERCOVITZ, *Examiner.*